Oct. 20, 1931.   J. R. LUNT ET AL   1,828,057
INSTRUCTION APPARATUS FOR ASTRONOMY
Filed May 19, 1930
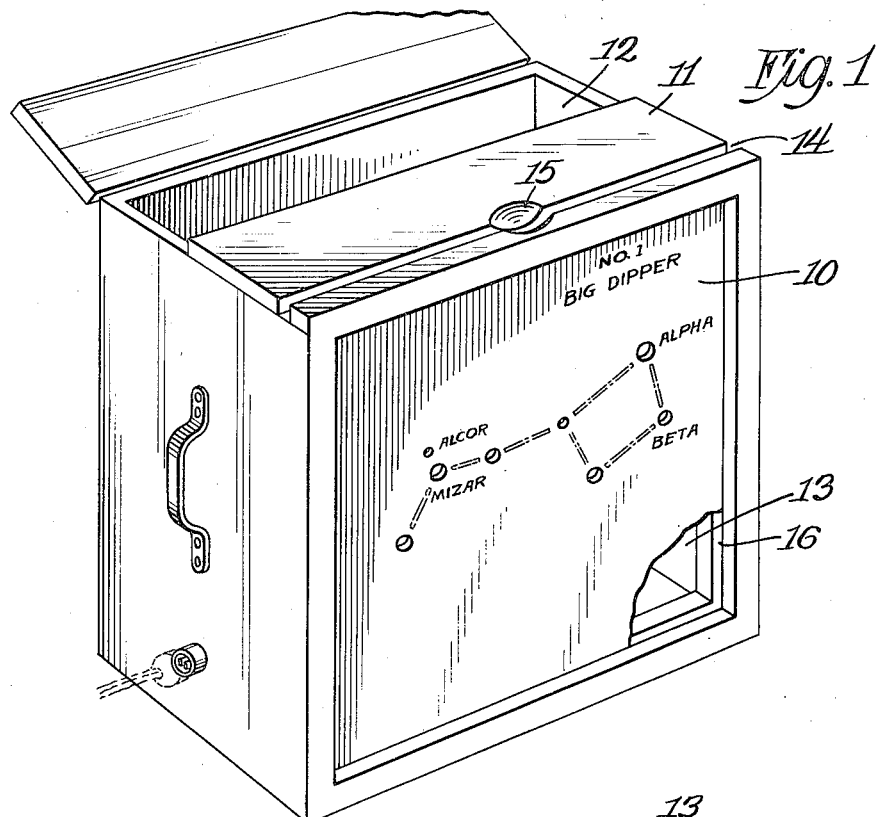
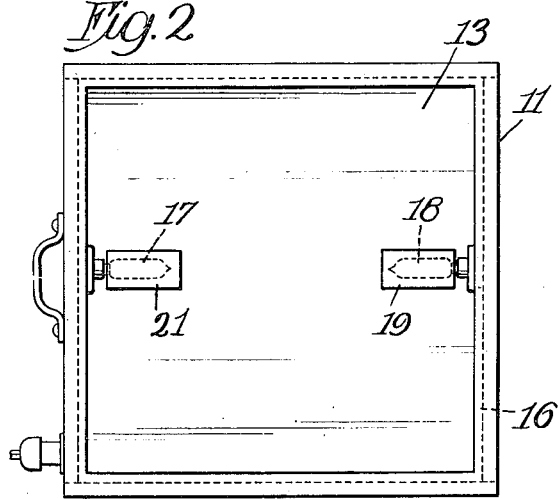
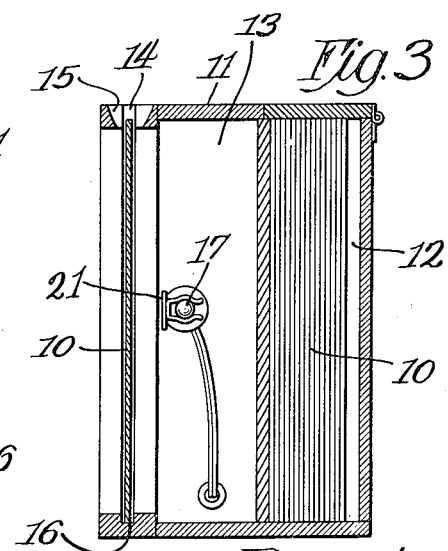
Inventors
Joseph R. Lunt
Dennis C. Haley
By Gillson, Swann &c
Attys.

Patented Oct. 20, 1931

1,828,057

UNITED STATES PATENT OFFICE

JOSEPH R. LUNT, OF WAKEFIELD, AND DENNIS C. HALEY, OF ROSLINDALE, MASSACHUSETTS, ASSIGNORS TO CENTRAL SCIENTIFIC COMPANY, OF CHICAGO, ILLINOIS, A CORPORATION OF ILLINOIS

INSTRUCTION APPARATUS FOR ASTRONOMY

Application filed May 19, 1930. Serial No. 453,675.

This invention relates to instruction apparatus for astronomy.

It is an object of this invention to produce a compact device for the presentation of constellations and star groups in a graphic and accurate manner, and to provide for the easy portability of such apparatus.

Other and further objects and advantages will become apparent as the disclosure proceeds and the description is read in conjunction with the accompanying drawings, in which Fig. 1 illustrates a general perspective view of the apparatus;

Fig. 2 is a front elevation showing the chart removed; and

Fig. 3 is a vertical section of the apparatus.

In teaching children stars and star groups, it is of considerable advantage that the method of presentation be graphic. It is not easy to translate a series of black dots upon a chart into their counterpart in the heavens.

The star charts, generally indicated by 10, may be reproduced by photographic processes, or may be lithographed on transluminescent material such as a roll of tracing cloth. One of such methods of reproduction which yields simply made, rugged charts will be described.

As the first step in any process of reproduction, photographs of the various star groups are taken and from the photograph, by means of a pantograph or other device in which the scale relationship may be maintained, the position of the stars is marked upon the chart. A series of different size holes is chosen to indicate the magnitudes of the stars, the stars of the first magnitude being indicated by a large hole, and smaller and smaller size holes as the magnitudes decrease. One of such holes is punched through the material of the chart at the points indicated by the pantograph.

Such a chart becomes the master, and a punch may then be made for producing a quantity of charts of the constellation or star group which is sought to be illustrated.

The age of the stars is also important. It is supposed that young stars are made up of very tenuous gases. They are, therefore, quite large, but the gases are not highly heated and such a star appears reddish. As the stars condense, the temperature rises higher and higher until middle age stars show an intense blue white. Old stars again become red. The condensation process has caused them to shrink.

By placing behind the perforations in the chart colored translucent sheets chosen in relation to the age of the star, not only the form of the constellation, but the individual characteristics of the stars making up the constellation may be illustrated.

The apparatus for presenting the charts consists of a cabinet 11 which is provided with a chart storage compartment 12 and an illuminating compartment 13. Across the top of the illuminating compartment runs a transverse slot 14 provided with a finger notch 15. The slot lies directly over a rabbet or channel 16 which gives clearance and support for the chart 10. Two lamps 17 and 18 are provided at the sides of the cabinet. These are shielded from throwing their light directly upon the chart 10 by the flat opaque shields 19 and 21. The interior of the illuminating compartment is covered with reflecting paint.

We have found it advantageous to provide as the socket a well known type passed for 110 volts but having standard automotive dimensions. Since the apparatus is frequently used in the open at night, the trouble lamp extension cord of an automobile may then be plugged in to the socket. The lamps 17 and 18 are replaced by low voltage lamps in this case.

Outdoor use of the apparatus in the dark renders it advisable also to make visible the names of the stars, or to draw lead lines outlining the constellation. This may be done by puncturing small holes through the material of the chart to form the letters, or the illuminated name may be provided by a stencil or other suitable method.

What we claim is:

1. A star chart for instruction in astronomy showing simultaneously the relative position, magnitude and temperature of a represented star, comprising a substantially opaque perforated sheet, the perforations bearing a scalar relation to the actual position and magnitude of the star, and colored transluminescent material covering the perforations, the color of which material bears a relation to the temperature of the star.

2. A star chart comprising a substantially opaque sheet provided with a plurality of transluminescent spots of varying sizes and color shades, the relative sizes of the spots being proportioned to the relative magnitudes of the stars of a given group and the relative shade of the color of each spot bearing a relationship to the supposed temperature of the star represented by said spot, whereby the magnitude and temperature of said star are indicated by the size and color respectively of the corresponding perforation.

3. A star chart comprising a substantially opaque sheet provided with a plurality of perforations and having transluminescent colored media applied to the sheet, the relative sizes of the perforations being proportioned to the relative magnitudes of the stars of a given star group and the relative shade of the colored medium associated with each perforation bearing a relationship to the supposed temperature of the star represented by said perforation, whereby the magnitude and temperature of said star are indicated by the size and color respectively of the corresponding perforation.

4. Instruction apparatus for astronomy including a cabinet, a source of light and a cooperating reflecting surface provided in the cabinet, a chart adapted to be mounted in a side of the cabinet provided with transluminescent spots, the sizes and relative positions of the spots bearing scalar relationships to the magnitude and position respectively of the stars of a constellation, and means cooperating with the source of light, the chart and the reflecting surface for making the quantity of light impinging on each of the spots substantially proportional to the size of the spot, regardless of the position of the spot with respect to the source of light.

5. Instruction apparatus for astronomy including a cabinet, a source of light and a cooperating reflecting surface provided in the cabinet, a chart adapted to be mounted in a side of the cabinet provided with transluminescent spots, the sizes and relative positions of the spots bearing a scalar relationship to the magnitude and position respectively of the stars of a constellation, and a shield positioned between the source of light and the chart for preventing passage of direct rays through the spots, whereby the quantity of light impinging on each of the spots is substantially proportional to the size of the spot, regardless of the position of the spot with respect to the source of light.

6. Apparatus as claimed in claim 4, in which the reflecting surface is a face of a partition provided in the cabinet spaced from one of the walls thereof, and in which the space between said partition and said wall constitutes a compartment for the storage of a plurality of charts.

In testimony whereof we affix our signatures.

JOSEPH R. LUNT.
DENNIS C. HALEY.